Jan. 28, 1936.  W. M. ROARK  2,028,953
SAFETY STEERING ROD
Filed June 3, 1935  2 Sheets-Sheet 1
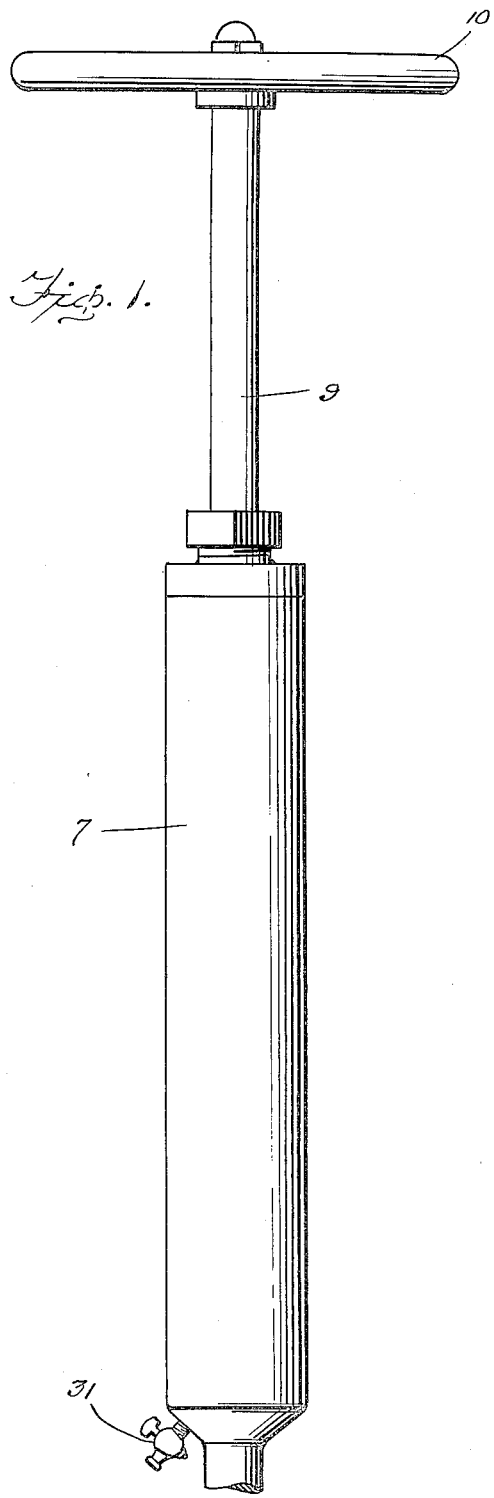
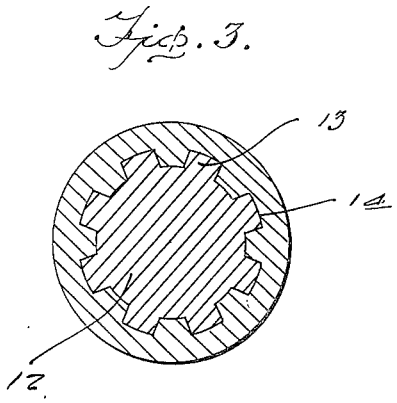
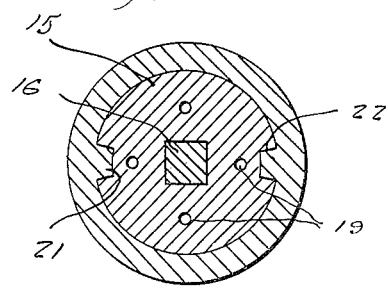
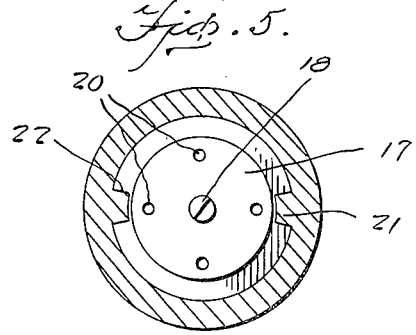
Inventor
W. M. Roark
By Clarence A. O'Brien
Attorney Jan. 28, 1936.  W. M. ROARK  2,028,953
SAFETY STEERING ROD
Filed June 3, 1935   2 Sheets-Sheet 2
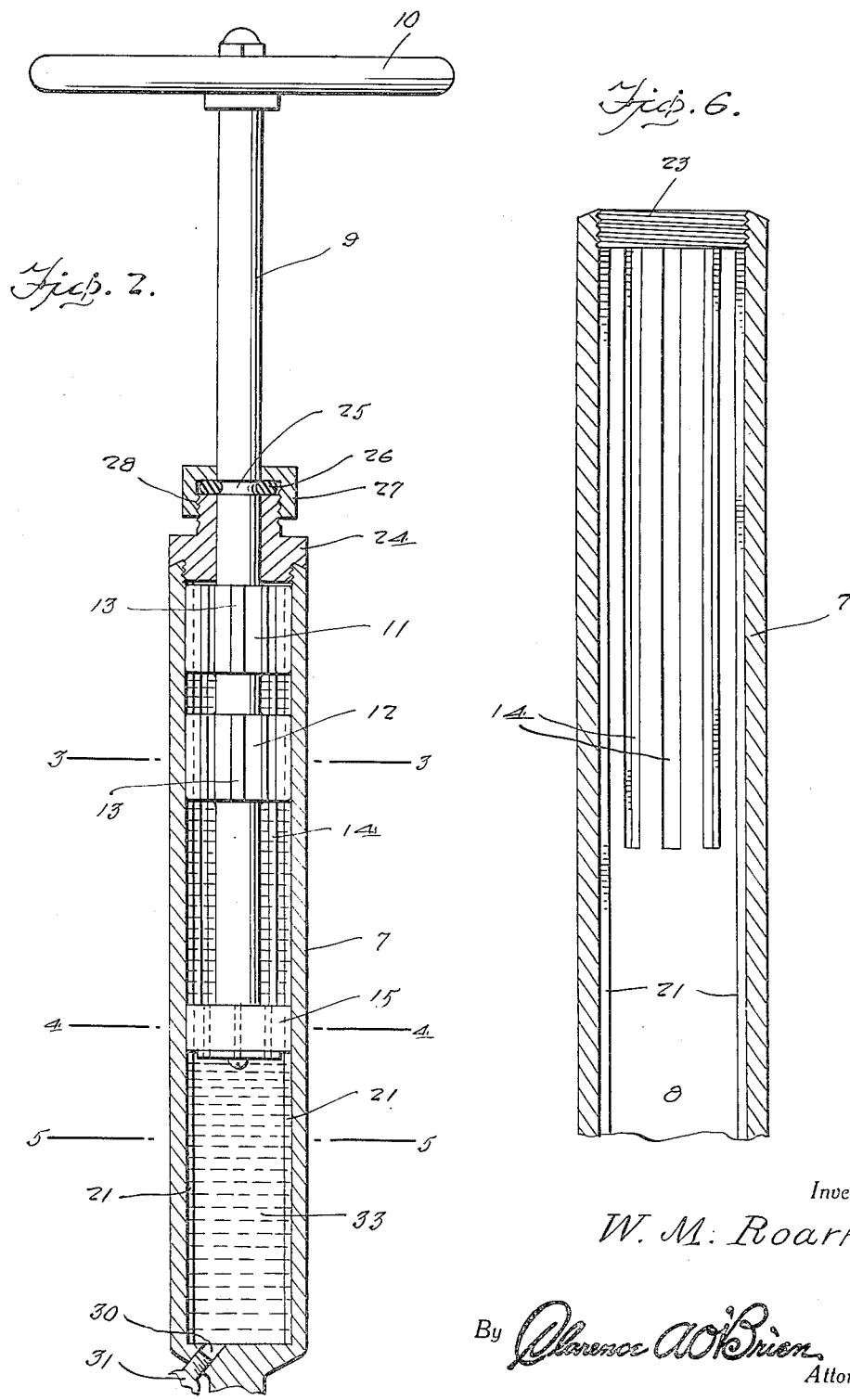
Inventor
W. M. Roark
By Clarence A. O'Brien
Attorney Patented Jan. 28, 1936

2,028,953

UNITED STATES PATENT OFFICE 2,028,953

SAFETY STEERING ROD

William Middleton Roark, Perryton, Tex.

Application June 3, 1935, Serial No. 24,722

2 Claims. (Cl. 74—493)

This invention relates to safety steering rods.

The primary purpose of the present invention is to devise a steering post for automobiles which will permit the post to collapse from the impact of the human body thrown against the steering wheel in event of an automobile accident.

Further objects of the invention are to provide a sectional steering post with a dash pot construction so as to eliminate shock to the human body and injury to the human body when the two sections of the post are collapsed.

Still further objects of the invention are to provide a collapsible steering post that is strong, compact and durable, thoroughly reliable for its intended purpose, that is easily installed in an automobile, and that is comparatively inexpensive to manufacture.

With the foregoing and other objects in view, the invention consists of a novel construction, combination and arrangement of parts as will be hereinafter more specifically described and illustrated in the accompanying drawings wherein is disclosed an embodiment of the invention, but it is to be understood that changes, variations and modifications may be resorted to without departing from the spirit of the claims hereunto appended.

In the drawings wherein like reference characters denote corresponding parts throughout the several views:

Figure 1 is a side elevation of the steering post in accordance with the present invention.

Figure 2 is a detailed vertical section thereof.

Figures 3, 4 and 5 are detailed sectional views taken substantially on the respective lines 3—3, 4—4, and 5—5 of Figure 2.

Figure 6 is an enlarged longitudinal section of the upper end of the cylindrical section of the steering post.

Referring to the drawings in detail it will be seen that the steering post of the present invention consists of a cylindrical inner section 7 having an elongated cylindrical chamber 8. The upper section of the steering post is indicated at 9 and is formed of a rod having a cross section of less diameter than the diameter of the chamber 8. On the free upper end of the upper section 9 is mounted a steering wheel 10. Under normal conditions a little more than one half of the lower portion of the upper section 9 extends into the chamber 8 of the cylindrical section 7.

On an intermediate portion of upper section 9 are a pair of spaced annular collars 11, 12 which conformably fit in the chamber 8. On these collars 11, 12 are tongues 13 that are adapted to slide in grooves 14 formed in the wall of the chamber 8. The grooves extend from the upper end of the lower cylindrical section 7 a little more than one half of the length of the cylinder. The inner end of upper section 9 terminates in a piston 15 secured to the reduced portion 16 by means of a disk 17 held in position by the screw 18. Extending axially of the piston 15 in the region of the margin thereof are circumferentially spaced openings 19 and these openings register with similar openings 20 on the disk 17. It will thus be seen that by loosening screw 18 and moving the disk relative to the piston the openings 19 may be restricted as desired thereby regulating the flow of liquid through the openings.

Extending from one end of the cylindrical section 7 to the other on the diametric opposite sides thereof in the chamber 8 are inwardly projecting tongues 21 which serve as splines to ride in the grooves 22 on the piston. The tongues 13 on collars 11, 12 form a spline with respect to the grooves 14 and these together with the splined construction on the piston prevents the upper rod section 9 from turning radially with respect to the cylindrical section 7.

While the steering post of the present invention is being used under normal conditions, the parts are in the position shown in Figures 1 and 2 of the drawings. To retain the upper section 9 extended to this position, the upper end of cylindrical section 7 is threaded as at 23 to receive the lower end of the bushing 24 that seals the upper end of the chamber 8. Around an intermediate portion of the upper rod section 9 is an annular groove 25 positioned at a point where the rod section 9 emerges from the upper end of the bushing 24. A yielding rubber ring 26 has a portion thereof seated in the groove 25 and the outer portion thereof bears against the upper end of the bushing 24. To hold the yielding ring 26 a cap 27 embraces upper section 9 and is threadably connected as at 28 to the upper end of the bushing 24. Under normal conditions, when the two sections are assembled, the cap 27 has sufficient space between the periphery of the ring 26 and the inner wall of the cap to allow the yielding ring 26 to expand laterally out of the groove 25 when the impact of the human body strikes steering wheel 10 in event of an accident. However, under normal conditions, cap 27 maintains sufficient pressure on the yielding ring 26 to prevent upper section 9 from moving with respect to the cylindrical lower section 7.

The space between the piston 15 and the bottom of cylindrical chamber 8 is filled with a liquid preferably oil which liquid acts as a cushion when upper section 9 collapses from impact. When the upper section moves after the impact the oil passes through the openings 20, 19 in the disk and piston respectively, thereby offering a dash pot cushion to absorb some of the shock that would otherwise injure the body of the person thrown against the steering wheel 10. Leading from the bottom of chamber 8 is a passage 30 into which is screw threaded a pet cock 31 and the liquid 33 may be drained through the pet cock whenever it is desired to replenish the same.

Having thus described the invention, what is claimed as new is:

1. A steering post comprising a lower cylindrical section and an upper rod section extending into and splined to the cylindrical section, a dash pot construction between the inner end of the upper section and the cylindrical section, a laterally yielding joint between the two sections normally retaining the upper rod section in extended position which joint yields to permit upper rod section to move into the cylindrical section by impact of the human body in event of an accident.

2. A steering post comprising a lower cylindrical section and an upper rod section extending into the cylindrical section, a bushing on the upper end of the cylindrical section through which the upper rod section is adapted to slide, said upper section formed with an annular groove at a certain point, a portion of a yielding ring seated in the groove to normally retain the inner end of the upper rod section in spaced relation to the lower end of the cylindrical section, a cap on the bushing to normally retain the yielding ring seated in the groove and bearing on the bushing, liquid in the cylinder below the inner end of the upper rod section, and an apertured piston on the inner end of the upper rod section splined to the cylindrical section to form a dash pot when the ring yields under impact of the human body in an accident thereby permitting the upper rod section to slide within the cylindrical section.

WILLIAM M. ROARK.